UNITED STATES PATENT OFFICE.

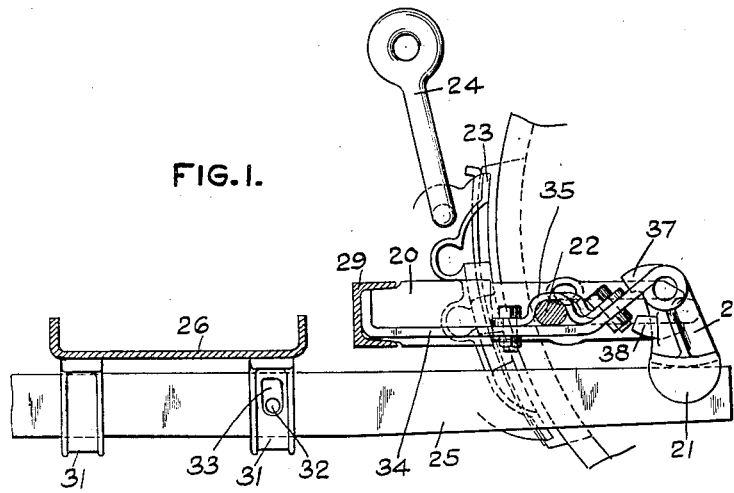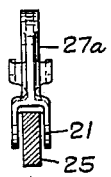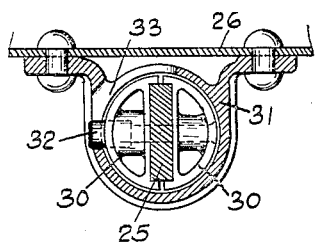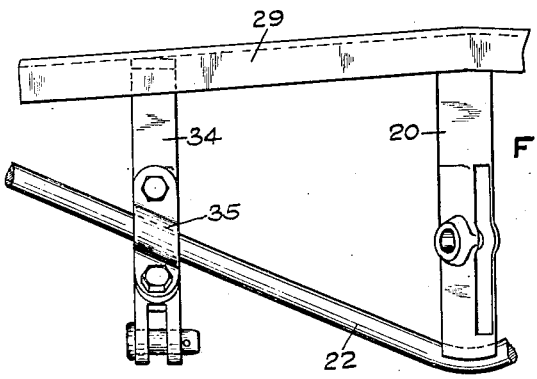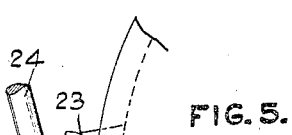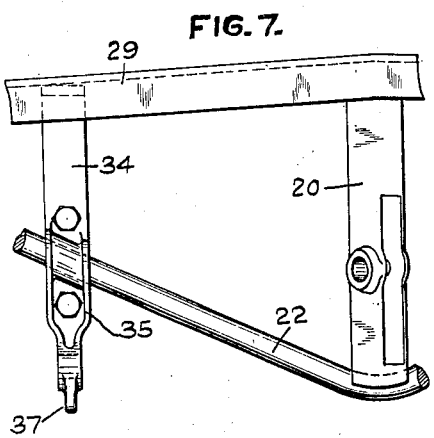

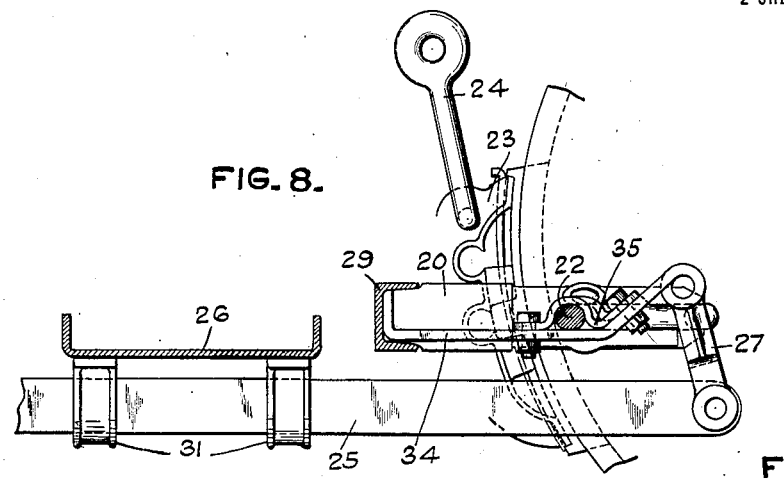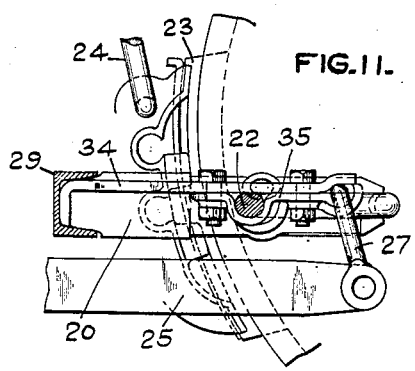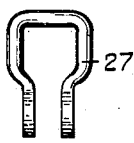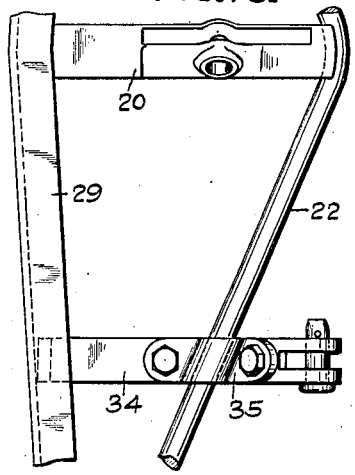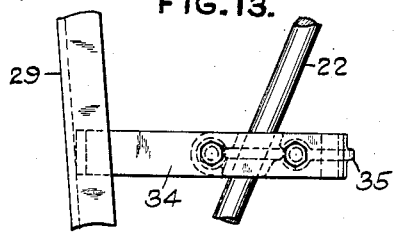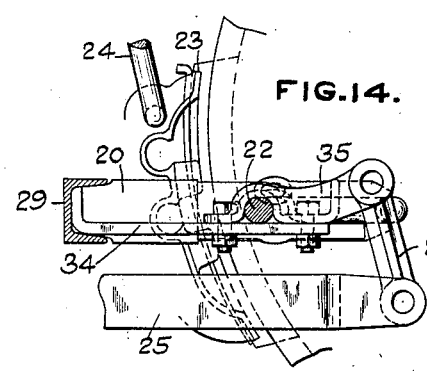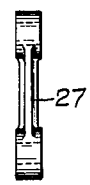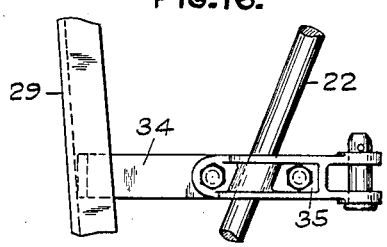

THOMAS L. BURTON, OF ST. LOUIS, MISSOURI.

BRAKE-BEAM SUPPORT.

1,340,010.  Specification of Letters Patent.  Patented May 11, 1920.

Application filed October 3, 1918. Serial No. 256,637.

*To all whom it may concern:*

Be it known that I, THOMAS L. BURTON, a citizen of the United States, residing at the city of St. Louis, in the State of Missouri, have invented a certain new and useful Improvement in Brake-Beam Supports, of which improvement the following is a specification.

This invention relates to means for supporting the brake beams of railway trucks and more particularly to the type of support known as the third and fourth point suspension in which there is employed, in addition to the usual hangers at the opposite ends of the brake beam, one or more supports for a portion of the brake beam, such as the fulcrum post, or strut, or truss rod, for the purpose of maintaining the brake beam substantially level and parallel in its various positions and under different conditions of wear of the brake shoes and wheels.

It has been proposed to provide one or more safety bars attached to the spring plank of the truck and extending beneath the brake beam for carrying this additional support for the strut member of the beam, and one of the objects of my present invention is to provide an improved support of this character in which the additional point or points is or are carried by a rocking member having depending flanges at opposite sides of the safety bar for guiding the rocker and preventing rotation of the safety bar.

Another feature of my invention comprises an improved bracket attachment by which the additional supporting member is pivotally connected to a trussed brake beam at each side of the center.

In the accompanying drawings, Figure 1 is a side elevation with parts in section, of one form of brake beam suspension embodying my improvement; Fig. 2, an end view of the supporting rocker; Fig. 3, a plan of a portion of a trussed brake beam showing one form of bracket attachment therefor; Fig. 4, a transverse section of the safety bar and its connection with the spring plank of the truck frame; Fig. 5, a side elevation showing a modified form of bracket attachment for the brake beam; Fig. 6, an end view of the supporting rocker of Fig. 5; Fig. 7, a plan of a portion of a brake beam showing the bracket attachment of Fig. 5; Fig. 8, a view similar to Fig. 1, but showing a supporting link instead of a rocker; Fig. 9, an end view of the link shown in Fig. 8; Fig. 10, a plan of a portion of a brake beam having the form of bracket attachment shown in Fig. 8; Fig. 11, a side elevation showing a modified form of bracket attachment and link; Fig. 12, a detail view of said link; Fig. 13, a plan of the bracket attachment of Fig. 11; Fig. 14, a side elevation, showing a further modification; Fig. 15, a detail view of the link shown in Fig. 14; and Fig. 16, a plan of the bracket attachment shown in Fig. 14.

The brake beam may be of the usual trussed type having a main compression member 29, a strut 20, and a tension member, or truss rod, 22, with the ordinary brake shoes 23, and hangers 24.

According to one of the features of my improvement, a third or fourth point support consists of a rocker $27^a$, pivotally connected to the brake beam and mounted on the safety bar 25, with depending flanges 21, on opposite sides of the safety bar. The flanges 21 serve to guide the supporting rocker on the safety bar and also prevent the latter from turning in its support where it is provided with a connection adapted to be turned part way around to lock said safety bar against longitudinal movement. Such a connection is indicated in Figs. 1 and 4, where the rectangular safety bar 25 is fitted with semi-cylindrical filling blocks 30, mounted within the supporting bracket 31, attached to the spring plank 26, of the truck frame, the bracket having a groove, or slot 33, for the pin or projection 32 of the filling blocks to turn in by a partial rotation of the safety bar.

While the rocker, or additional supporting member may be pivotally connected to the brake beam in any suitable manner, I prefer, in the case of the usual trussed brake beam, to provide a bracket attachment carried by both the compression member, and the truss rod of the brake beam and pivoted at its end to the additional supporting link or rocker, the bracket member being applied one at each side of the center of the brake beam and coöperating with corresponding safety bars and supports, and this comprises another feature of my invention.

As shown in Figs. 1 and 3, the bracket attachment consists of a main bar 34, extending from the compression member 29, to the truss rod 22, and a clamp section 35, for rigidly fastening the bracket to the truss rod of the brake beam. The bracket may be connected to the compression member 29 in any suitable manner but where this member of the brake beam is formed of a metal section with lateral flanges, such as a channel section, the bar 34 is preferably bent at right angles at its end and fitted in between the flanges as shown in the drawings. This holds the main bar in place when the clamp section is rigidly secured to the truss rod.

In the construction shown in Figs. 1 and 3, the main bar 34 is extended and carries the pivot for the supporting rocker at its end, but in the modification shown in Figs. 5 and 7, the clamp section 35 of the bracket is extended and carries the pivot for the rocker. Suitable stops 37, and 38 may be provided to limit the movement of the rocker on its pivot.

The modification shown in Figs. 8, 9 and 10, is substantially the same as that of Figs. 1 and 3, except the additional support is in the form of a link 27, pivoted at its upper end to the bracket bar 34, and at its lower end to the safety bar 25.

In the modification shown in Figs. 11, 12 and 13, the pivot for the supporting link 27, is formed by both the main bar 34 and the clamp section 35 of the bracket and the link is of an inverted U shape.

The construction shown in Figs. 14, 15 and 16 is similar to that of Figs. 5 and 7, except that the supporting link 27 is employed instead of the rocker.

In all of these modifications, the operation is substantially the same, as the brake beam has two additional points of support which by means of either the link or the rocker coöperates with the usual hangers of the brake beam to maintain the same in a substantially horizontal and parallel relation as the beam swings between its application and release positions.

Having now described my invention what I claim as new and desire to secure by Letters Patent is:

1. In a brake beam suspension, the combination with a trussed brake beam, of a safety bar extending beneath the brake beam, a bracket connected to the compression member and to the tension rod of the brake beam, at one side of the center of the beam, and a supporting member for said bracket mounted on the safety bar.

2. In a brake beam suspension, the combination with a trussed brake beam, of a bracket rigidly attached to the compression member and the tension rod of the brake beam, at one side of the center, and a supporting member pivotally attached to said bracket.

3. In a brake beam suspension, the combination with a trussed brake beam, of a bracket formed of a main bar extending from the compression member of the beam to the tension rod, and a clamp section for fastening the bracket to the tension rod, and a supporting member pivotally connected to said bracket.

4. In a brake beam suspension, the combination with a trussed brake beam having a compression member provided with flanges, of a bracket formed of a main bar bent at right angles at its end and fitted between said flanges, and a clamp section for fastening the bracket to the tension rod of the brake beam; and a supporting member connected to said bracket.

5. In a brake beam suspension, the combination with a trussed brake beam, of a bracket formed of a main bar extending from the compression member to the truss rod of the brake beam, and a clamp section securing the bracket to the truss rod; and a supporting member pivotally connected to the clamp section of the bracket.

6. In a brake beam suspension, the combination with the brake beam, of a rectangular safety bar supported from the truck frame and extending beneath the brake beam, a connection between the safety bar and its support operated by a partial rotation of the bar for locking the same against longitudinal movement, and a rocker support mounted on the safety bar with flanges extending downward on opposite sides thereof, said rocker being pivotally connected with said brake beam.

In testimony whereof, I have hereunto set my hand.

THOMAS L. BURTON.